United States Patent [19]

Lewis et al.

[11] Patent Number: 5,198,114
[45] Date of Patent: Mar. 30, 1993

[54] DOLOMITIC ACTIVATED CARBON FILTER

[76] Inventors: David L. Lewis, 110 Honey Tree Dr., Athens, Ga. 30605; Gene E. Michaels, 1945 Cherokee Rd., Winterville, Ga. 30683

[21] Appl. No.: 306,104

[22] Filed: Feb. 6, 1989

[51] Int. Cl.$^5$ .............................. C02F 1/28; C02F 3/00
[52] U.S. Cl. .................................. 210/610; 210/679; 210/694; 210/502.1; 210/503
[58] Field of Search ............... 210/610, 611, 616, 617, 210/679, 694, 150, 151, 263, 502.1, 503, 504, 506

[56] References Cited

U.S. PATENT DOCUMENTS 4,427,548  1/1984  Quick .................................. 210/150

Primary Examiner—Ivars Cintins
Attorney, Agent, or Firm—James B. Middleton

[57] ABSTRACT

A water filter provides good tasting, potable water without chemical biocides. A water filter utilizing activated carbon to rid the water of undesirable chemicals and the like has dolomite added to the activated carbon. The dolomite acts as a nutrient for harmless bacteria and thereby promotes the growth of the harmless bacteria to the exclusion of harmful bacteria. Dolomite produces a slight alkalinity for improved taste, provides magnesium and calcium as dietary supplements, and encourages the growth of bacteria that produce no undesirable metabolites.

8 Claims, 1 Drawing Sheet

DOLOMITIC ACTIVATED CARBON FILTER

INFORMATION DISCLOSURE STATEMENT

Activated carbon filters have been used for the removal of potentially harmful chemicals from drinking water. There is concern that microbial growth occurring in such filters may lead to infection or toxicosis in persons drinking the filtered water, as a result of toxic metabolites produced during the growth of microorganisms. Treated municipal water and activated carbon do not normally support the growth of high concentrations of microorganisms, and therefore do not usually warrant concern over microbial contamination. These concerns primarily arise from the probabilities of entrapping organic matter in the filters because the organic matter can serve as nutrients for microbial growth. Organic matter may enter filters in water pumped from wells in that the filters tend to entrap insects and other small animals. Organic matter may enter water filters from food prepared in kitchen areas when such water filters are not permanently connected to water lines.

Historically, the problem of microbial growth in water filters has been handled by the addition of biocides such as silver compounds to the filters. For example, biocide-treated water filters are disclosed by U.S. Pat. Nos. 3,872,013 and 4,145,291. The biocides are not strongly sorbed by activated carbon; therefore, the chemicals remain in solution in sufficient concentrations to elicit biocidal or biostatic effects on microorganisms living in water that passes through the filters.

The adverse, life-long chronic effects of trace concentrations of these biocides on persons drinking biocide-treated water are presently unknown, but the possibility of some effects causes concern since water filters are designed to remove potentially toxic chemicals that occur in trace concentrations in the drinking water.

SUMMARY OF THE INVENTION

This invention relates generally to water filters, and is more particularly concerned with a water filter wherein harmless bacteria inhibit the growth of harmful bacteria.

The present invention provides a water filter having a nutrient for promoting the growth of specific bacterial species, such bacterial species being harmless to humans and inhibiting the growth of other microorganisms that may be harmful to humans. In the preferred embodiment of the invention, a combination of dolomite and activated carbon is used, the dolomite being a good nutrient for the desired species of bacteria without adding toxic materials or undesirable odors to the water.

One method of using the present invention is to allow normal microorganisms to accumulate in the filter to provide the desired colony. Alternatively, the filter can initially be sterilized, then seeded with the desired species of bacteria. In either case, the species of bacteria that thrives on the supplied nutrients will, due to natural competition, inhibit the growth of other species of bacteria.

BRIEF DESCRIPTION OF THE DRAWINGS

These and other features and advantages of the present invention will become apparent from consideration of the following specification when taken in conjunction with the accompanying drawings in which.

DESCRIPTION OF THE PREFERRED EMBODIMENT

Figure 1:
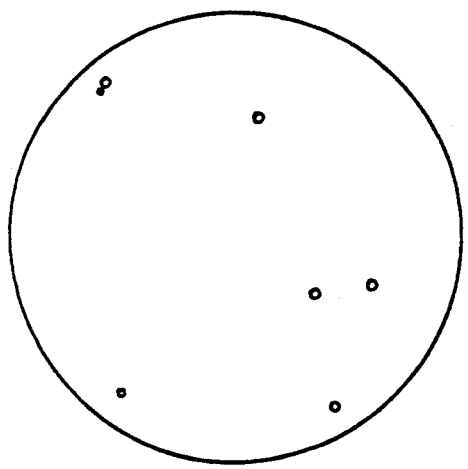
FIG. 1 illustrates a bacterial colony grown on nutrient agar from a 10 fold dilution of water taken from a conventional activated carbon filter.

The method of the present invention uses a resident population of harmless microorganisms in a water filter to preclude the growth of potentially harmful microorganisms by microbial competition. Microbial competition for space and nutrients among microbial species is a process that is a major factor in determining which microorganisms inhabit a given environmental niche at any particular time. It is because of the absence of this competitive process that animals having their gut microflora eliminated or injured by chemical therapy exhibit a high susceptibility to subsequent invasion by pathogenic microorganisms. Humans that have their normal gut flora damaged as a result of antibiotic treatment or chemotherapy, for example, are much more susceptible to infection by *Vibrio cholerae* (the causal agent of cholera) and *Shigella dysenteriae* (the causal agent of bacterial dysentery), and even by organisms that are not normally pathogenic, such as *Bacillus subtilus* and *Micrococcus luteus*. These invading microorganisms utilize space and nutrients that would otherwise have been taken up by the resident populations of harmless microorganisms normally inhabiting their gut. Similarly, a water filter in which a resident population of harmless microorganisms is maintained is much less susceptible to invasion by, and subsequent proliferation of, potentially harmful microorganisms.

Although there are many approaches whereby a resident population of harmless bacteria can be maintained in a water filter, the composition of microbial assemblages is highly sensitive to the physical, chemical, and biological environment to which it is exposed. The particular approach used to maintain a microbial population, therefore, must be carefully designed to achieve the desired results. This concern is especially true with regard to water filters, where one must pay particular attention to taste and odor problems that may result from chemical or biological treatments of the filter. For example, the growth and maintenance of harmless bacteria in water filters can be achieved through the addition of proteinaceous nutrients such as meat extracts. However, the growth of toxin-producing, pathogenic bacteria, such as species of Clostridium, Staphylococcus, and Streptococcus, which also produce taste and odor problems, are favored by the presence of proteins. Also, the prolific growth of alcohol-producing fermentative organisms, such as various species of Saccharomyces, makes the addition of sugars, such as glucose or sucrose, an undesirable approach to maintaining a resident microbial population in water filters.

The addition of inorganic nutrients, such as ammonium, nitrate, phosphate, sulfate, calcium, or magnesium ions, can also elevate the concentrations of microorganisms and allow for the maintenance of a resident population of microflora. Most forms of these ions, however, present taste problems, primarily because the pH of the filtered water is either too high or too low. Calcium oxide (lime), for example, makes the pH of the water too high, and sulfates can make the pH too low, as well as cause odor problems.

These difficulties are not encountered with the combination of dolomite and activated carbon. Dolomite is a naturally occurring mixture of calcium and magnesium carbonate; and, in the present invention, dolomite is simply mixed with activated carbon for filtering water in conventionally designed water filters. During periods of time in which there is no water flow through the filter, the additional cationic nutrients provided by dolomite enhance the normally low concentrations of harmless bacteria in drinking water by 100 to 1000 fold. Dolomite not only provides nutrients for the microorganisms, but also maintains a pH range of slight alkalinity that is desirable to the taste of finished water. Moreover, the calcium and magnesium added to the filtered water act as dietary supplements of these important cations. The absence of a significant concentration of calcium and magnesium cations in drinking water has been correlated with coronary disease, therefore, the benefits of dolomitic carbon filters to human health may extend beyond the safe removal of potentially toxic chemical contaminants from drinking water without the addition of biocides.

Filters have been made in accordance with the present invention using admixtures of dolomite granules with activated carbon in ratios of 10 parts of dolomite to 80 parts of activated carbon, by weight. Obviously, the ratio of dolomite to carbon can be varied considerably since the object is to provide nutrients for particular species of bacteria. Also, a steam-activated, coconut shell, charcoal was used in the above mentioned dolomitic carbon filters. Carbon is typically activated by heating it with traces of metal chlorides; but, traces of metal chlorides remaining with the activated carbon, and leached into the filtered water, may affect the species composition of microbial populations in the filters. Additionally, the chlorides may pose a problems similar to that of having biocides in the filter, in that they may pose some threat of chronic health effects on persons drinking the filtered water.

Figure 2:
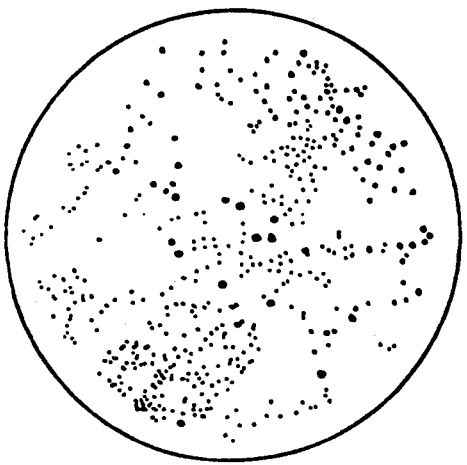
FIG. 2 is a view similar to FIG. 1, the filter having dolomite added to the activated carbon.
Figure 3:
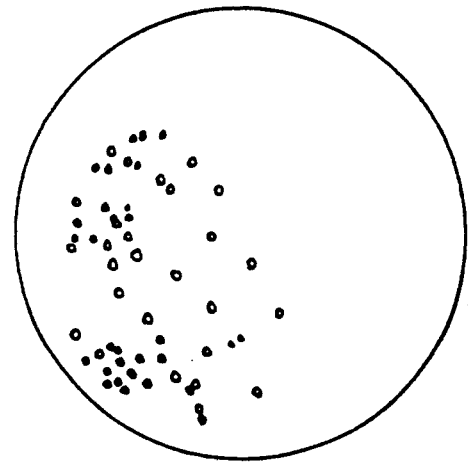
FIG. 3 illustrates a bacterial colony grown on a plate of phenylethyl alcohol from an undiluted sample of water taken from the same filter used for the illustration of FIG. 1; and, FIG. 4 is a view similar to FIG. 3, the sample having been taken from the filter used for the illustration of FIG. 2.
Figure 4:
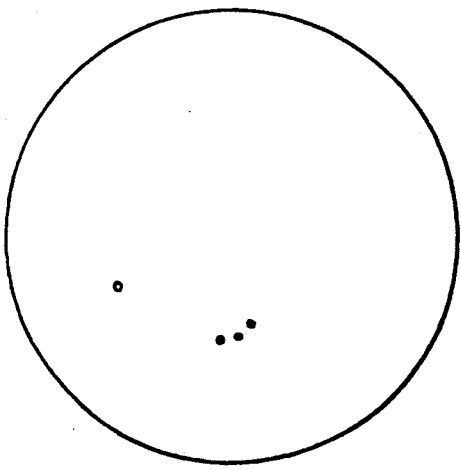

The dolomitic carbon formulations described above elevated natural microbial populations in water filters 100 to 1000 fold, and inhibited, for example, the growth of potentially harmful gram-positive, blood lysing, bacteria in phenylethyl alcohol plates. By way of example, the drawings are illustrations of bacterial colonies that appeared on microbiological plates. Specifically, FIG. 1 illustrates the colony grown from a 10-fold dilution of a 1 ml water sample taken from a commercial activated carbon filter and plated on a nutrient agar. FIG. 2 illustrates the colony grown on a nutrient agar plate from a 10-fold dilution of a 1 ml water sample taken from a commercial activated carbon filter like the filter used for the illustration of FIG. 1, in which dolomite was added to the activated carbon. FIG. 3 illustrates the colony grown from an undiluted 1 ml water sample taken from the same filter used for the colony of FIG. 1 and plated on a phenylethyl alcohol plate. Finally, FIG. 4 illustrates the colony grown from an undiluted 1 ml water sample taken from the same filter used for the illustration of FIG. 2 and plated on a phenylethyl alcohol plate. The nutrient agar plates shown in FIGS. 1 and 2 indicate the total concentrations of bacteria, and show the enhanced total bacterial concentration that resulted from treatment of the filter with dolomite. The phenylethyl alcohol plates shown in FIGS. 3 and 4 indicate the concentrations of potentially harmful gram-positive, blood lysing bacteria, and show the inhibitory effects of the elevated concentrations of harmless bacteria in the dolomitic filter on the growth of the potentially harmful bacteria.

Dolomite, activated carbon, various components of water filters, and drinking water are normally contaminated with low concentrations of harmless microorganisms. In accordance with the present invention, the concentrations of these harmless microorganisms are enhanced by the addition of specific nutrients. By promoting the growth of the desirable, or harmless, bacteria, the undesirable, or harmful, bacteria are virtually excluded through the normal competitive processes.

It is also contemplated in the present invention to sterilize the filter first, then seed the filter with one or more specific microbial species. Sterilization of the filter can obviously be accomplished with heat, ionizing radiation, or other conventional techniques. After sterilization, the filter can be seeded with selected bacterial species, pure cultures of the desired microbial species being added in liquid or dry preparations to the sterile filter. With such an arrangement, those skilled in the art will realize that bacterial species that are common to the human gut can be used to seed the filter, and the water from the filter can be used for the recolonization of gut microflora in persons undergoing antibiotic treatment or chemotherapy. Filters treated in this manner can therefore serve as a continuous source of gut microflora in drinking water.

From the foregoing discussion, it will be understood by those skilled in the art that the present invention provides a method for promoting the growth of naturally occurring bacteria to inhibit the growth of undesirable bacteria. Alternatively, a water filter can be fully sterilized, then seeded with desirable bacteria, and the present invention provides a method to maintain the filter in the desired condition by providing nutrients for the desirable bacteria. The filter of the present invention will yield highly desirable water in that the flavor of the water is good, the water contains no undesirable chemical or bacteria, and the filter is self sustaining so long as the supply of dolomite and activated carbon is present.

It will of course be understood by those skilled in the art that the particular embodiments of the invention here presented are by way of illustration only, and are meant to be in no way restrictive; therefore, numerous changes and modification may be made, and the full use of equivalents resorted to, without departing from the spirit or scope of the invention as outlined in the appended claims.

We claim:

1. A water filter, for providing potable water substantially free of harmful bacteria, said filter comprising a filter medium and a nutrient in said filter medium for promoting bacterial colonization of a selected species of bacteria, said nutrient consisting of dolomite, and a colony of said selected species of bacteria in said filter, said selected species of bacteria consisting of a harmless microorganism normally surviving in the human gut, the arrangement being such that said harmless microorganism is nourished by said dolomite to exclude harmful bacteria from said filter medium through natural competition.

2. A water filter as claimed in claim 1, said water filter further including activated carbon as said filter medium.

3. A water filter as claimed in claim 2, wherein said activated carbon comprises steam-activated carbon.

4. A water filter as claimed in claim 3, wherein the ratio of said dolomite to said activated carbon is approximately 10 to 80.

5. A method for providing potable, filtered water, said method including the steps of placing a nutrient for a selected species of bacteria in a filter for promoting the growth by nourishing said selected species of bacteria in said filter, so that said selected species of bacteria inhibits the growth of other species of bacteria through natural competition, said nutrient consisting of dolomite, said selected species of bacteria consisting of a harmless microorganism normally surviving in the human gut, seeding said filter with said harmless microorganism, and subsequently passing water through said filter for filtering the water and providing said potable filtered water.

6. A method as claimed in claim 5, said filter including activated carbon as a filter medium, said step of placing a nutrient in said filter consisting of the step of adding dolomite to said activated carbon filter medium.

7. A method as claimed in claim 6, and further including the steps of sterilizing said water filter for killing all microorganisms in said water filter prior to said step of seeding said water filter with said harmless microorganism.

8. A method as claimed in claim 5, and including the step of utilizing water from said filter for providing said harmless microorganism to the gut of those who drink the filtered water.

* * * * *